March 11, 1969  J. J. LOVINGHAM ET AL  3,431,732
CONTROL FOR BIPROPELLLANTS IN ROCKET ENGINE
Filed Jan. 23, 1967 Sheet 1 of 3
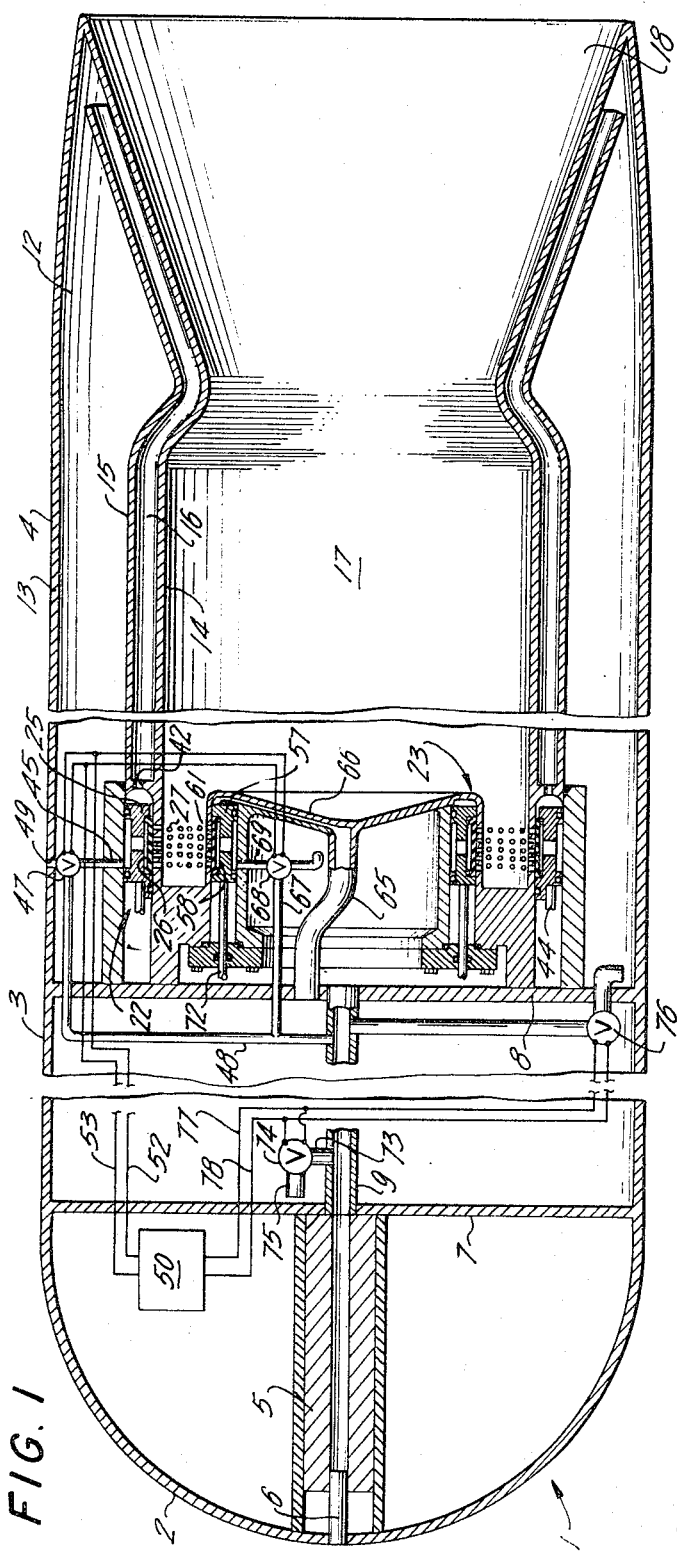
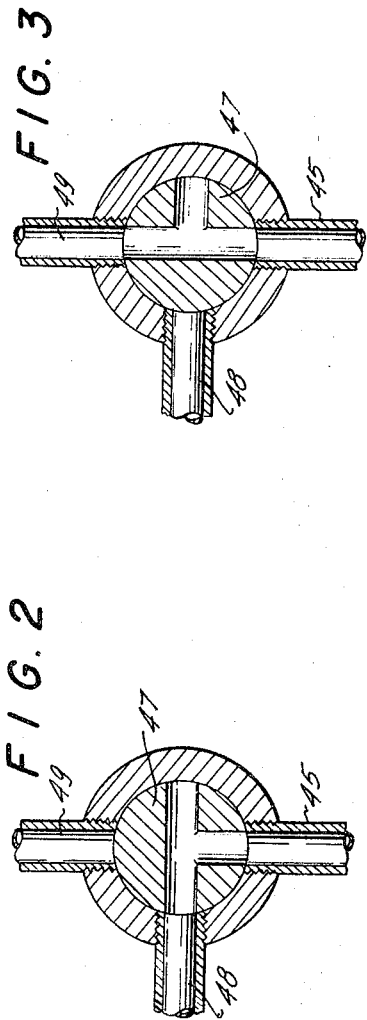
INVENTORS.
JOSEPH J. LOVINGHAM
BY HENRY J. SOSSONG
ATTORNEYS

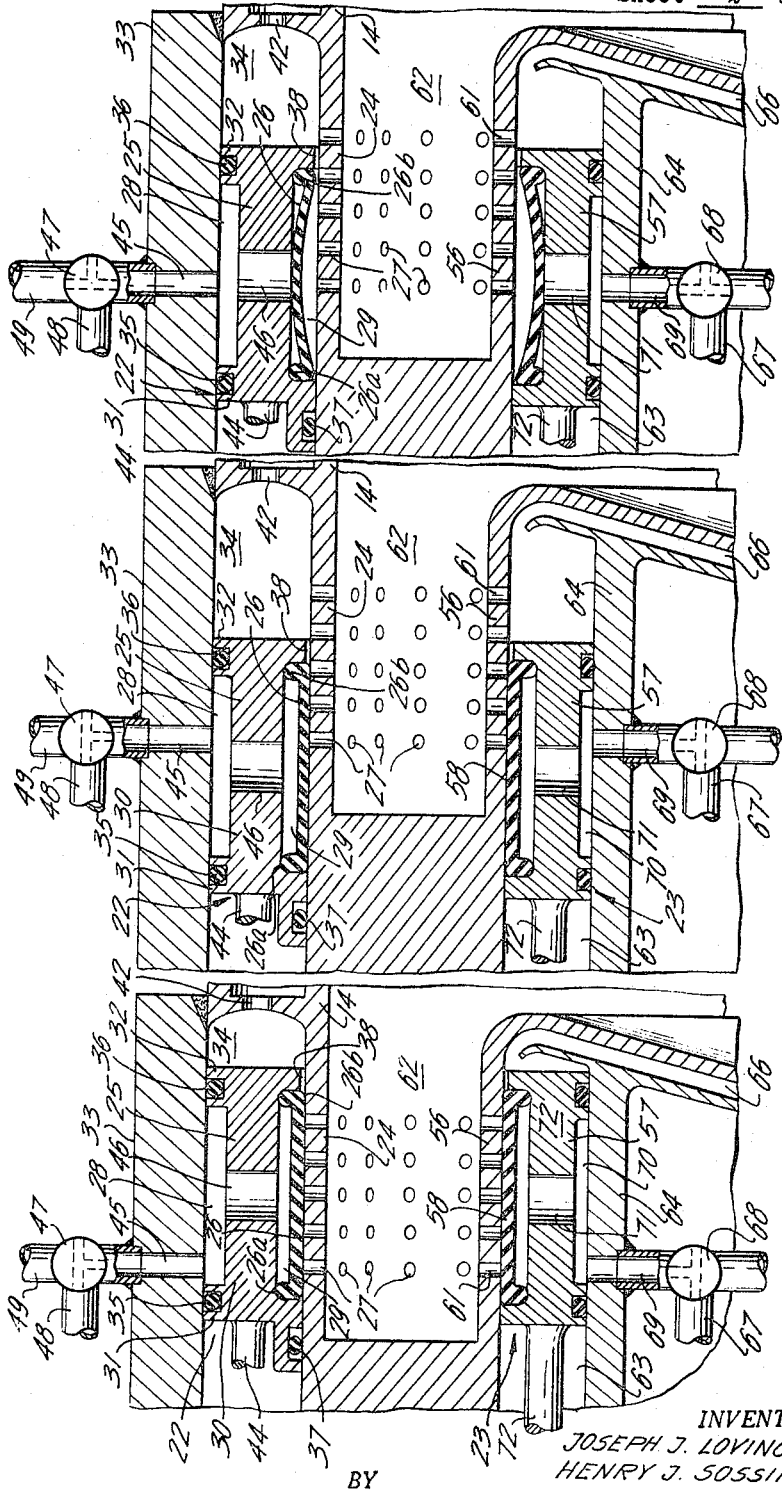

FIG.7
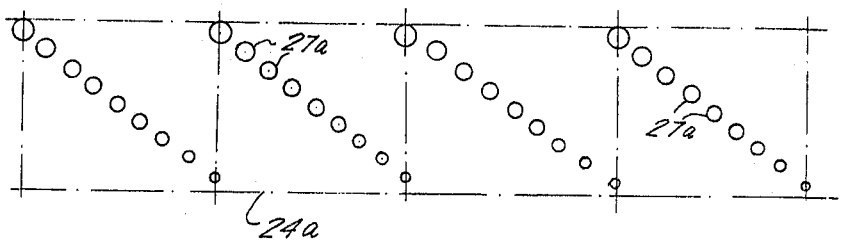
FIG.8
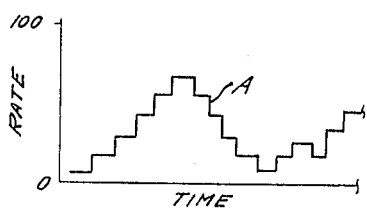
FIG.9
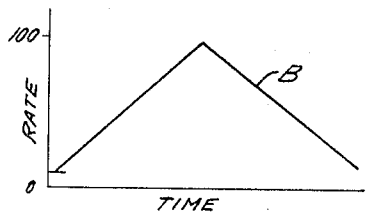
FIG.10
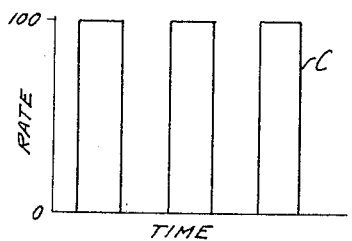
FIG.11
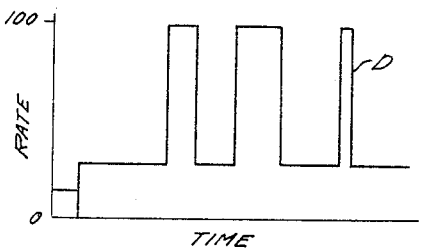
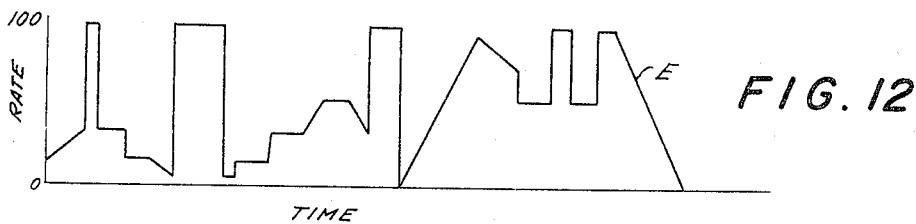
FIG.12

United States Patent Office 3,431,732
Patented Mar. 11, 1969

3,431,732
CONTROL FOR BIPROPELLANTS IN ROCKET ENGINE
Joseph J. Lovingham, Madison, and Henry J. Sossong, Rockaway, N.J., assignors to Thiokol Chemical Corporation, Bristol, Pa., a corporation of Delaware
Filed Jan. 23, 1967, Ser. No. 611,028
U.S. Cl. 60—247                                  12 Claims
Int. Cl. F02k 9/02; F16k 3/02

ABSTRACT OF THE DISCLOSURE

In a system for controlling flow of liquids, and especially bipropellants to the combustion chamber of a rocket engine, a value having a slide to cover and uncover successive ports and a flexible sleeve controlled by motive fluid to cover and uncover ports underlying the slide for varying periods to produce continuous and/or intermittent pulses of flow.

---

The present invention relates to a control mechanism for regulating the flow of liquid and more particularly to throttling the flow of one or more liquids, such as bipropellants, to a location where the liquids are used, such as the combustion chamber of a rocket engine.

The flow of propellant liquids from storage tanks to the combustion chambers of rocket engines has heretofore been controlled by slide valves. The slide valve shears sealing cups projecting from outlet ports in the wall of the tank and aligns ports in the slide with the outlet ports from the tank. The propellant then flows into the combustion chamber at a rate depending upon the size of the outlet ports and the pressure of the propellant liquid. It has also been proposed to vary the rate of flow from a storage tank to the combustion chamber of a rocket engine by a slide valve for uncovering successive outlet ports as the valve moves from a closed to a fully opened position. Furthermore, it has been proposed to control the flow of liquid from a tank having a fixed outlet port or ports by a movable valve element operated intermittently to open the fixed outlet for varying periods of time.

One of the objects of the present invention is to provide an improved valve arrangement for controlling the rate of flow of liquids which greatly increased the range of variations in flow rates.

Another object is to provide an improved control valve arrangement for regulating the flow of bipropellants to a combustion chamber and which may be modulated to produce a large variety of throttling patterns for different operating conditions.

Still another object is to provide an improved valve arrangement which is of simple and compact construction, economical to manufacture and one which is reliable in operation for continuously throttling the flow of liquid propellant and varying its rate of flow and thrust produced on the engine from zero, or any level above zero, to a maximum thrust with a positive shut-off when required.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 1 is a longitudinal sectional view of a rocket engine incorporating the novel control valve arrangement of the present invention;

FIGURE 2 is a enlarged view of a two-way auxiliary valve for controlling the flow of a motive fluid for actuating the main valve to a closed position;

FIGURE 3 is a view similar to FIGURE 2 showing the auxiliary valve positioned to open the main valve;

FIGURE 4 is an enlarged view of one side of the combustion chamber and showing the valve carriers of the control mechanism for bipropellants at one extreme end of their travel and the annular sleeves actuated to seal all of the orifice ports;

FIGURE 5 is a view similar to FIGURE 4 showing the valve carriers moved to uncover certain of the orifice ports and the flexible sleeves actuated to seal the remaining ports;

FIGURE 6 is a view similar to FIGURES 4 and 5 showing the valve carriers in still another position and the flexible sleeves released to uncover all of the ports during a pulsing operation;

FIGURE 7 is a projection of the cylindrical wall forming a valve seat for the valve mechanism and showing a modified pattern of the orifice ports of gradually increasing size arranged progressively along the valve seat;

FIGURE 8 is a graph of flow rate plotted against time and illustrating a stepped pattern of flow produced by an intermittent movement of the carrier when pressure is applied to the flexible sleeve;

FIGURE 9 is a diagram similar to FIGURE 8 and illustrating a continuous throttling action obtained by a continuous travel of the valve carriers;

FIGURE 10 is a diagram similar to FIGURES 8 and 9 and illustrating an off and on pattern obtained by an intermittent pulsing of the flexible sleeve;

FIGURE 11 is a diagram similar to FIGURES 7 to 10 showing an on and off pattern above a fixed thrust level by a combined movement of the sleeve carier and pulsing of the sleeve; and FIGURE 12 is a diagram similar to FIGURES 8 to 11 showing a still further, complex program of flow which may be obtained by the improved valve arrangement of the present invention.

While the present invention may have other uses for throttling the flow of a liquid from a tank, it is shown applied to a rocket engine for controlling the flow of a propellant liquid or bipropellant liquids to a combustion chamber. Such bipropellants may comprise a fuel, such as unsymmetrical dimethyl hydrozine (DMH), and an oxidizer, such as inhibited red fuming nitric acid (IRFNA). Referring now to the drawings, the rocket engine 1 to which the invention is shown applied comprises a forward section 2, an intermediate section 3 and a rearward section 4. The forward section 2 is adapted to carry the pay load and has a gas generator 5 therein at its axis for producing gas under pressure. The gas generator 5 may have any desired construction, but in the illustrated embodiment comprises a hollow grain of solid propellant having an igniter 6. Igniter 6 may be actuated by remote control to ignite an initiator such as black powder which, in turn, ignites the solid propellant for prdoucing gas under pressure.

The intermediate section 3 is in the form of a tank for a propellant, such as oxidizer, and is separated from the forward section 2 and the rearward section 4 by transverse walls or bulkheads 7 and 8. The intermediate section 3 also has an axial tube 9 extending rearwardly from the gas generator 5 through the bulkheads 7 and 8 and into the rearward section 4.

The rearward section 4 of the rocket engine 1 comprises a peripheral tank 12 for another liquid propellant, such as fuel, and the tank is formed between outer and inner peripheral walls 13 and 14. Preferably, the tank 12 has a guiding shield plate 15 for forming a channel 16 through which the liquid is caused to flow by acceleration and pressurizing forces acting on the liquid. The inner wall 14 of the rearward section 4 forms a cylindrical combustion chamber 17 and the rearward end of the wall 14 is shaped to form an outlet nozzle 18 through which the products of combustion escape to produce a forward thrust on the rocket engine. As thus far described, the rocket engine 1 is of generally conventional construction.

In accordance with the present invention a novel valve arrangement is provided for varying the flow of a liquid or liquids such as a bipropellant delivered to the combustion chamber 17 which is adapted to produce a great variety of variations in the flow rate and thrust pattern produced on a rocket engine.

As shown in FIGURES 1 to 6 the valve arrangement comprises one valve 22 for controlling flow of one liquid propellant, such as fuel, and another cooperating valve 23 for controlling another liquid propellant, such as an oxidizer. The valve 22 comprises a cylindrical valve seat 24, a sliding valve carrier 25 and flexible valve closure 26 movable with the sliding carrier 25 as well as relative thereto. The cylindrical valve seat 24 comprises a section of the peripheral wall 14 having a plurality of orifice ports 27 therein. The sliding valve carrier 25 is in the form of a ring slidable on the cylindrical valve seat 24, and has inner and outer annular recesses 28 and 29, see FIGURES 4 to 6, forming an annular web 30 with circular end flanges 31 and 32 surrounding the cylindrical valve seat 24. An outer wall 33 cooperates with the inner wall forming the valve seat to form a chamber 34 in which the annular valve carrier 25 slides. Annular seals, such as O-rings 35, 36 and 37, are provided on the inner and outer peripheries of the end flange 31 and the outer periphery of the end flange 32. The inner periphery of the end flange of 32, however, has no seal and provides an annular opening 38 through which liquid to be controlled flowing from channel 16, see FIGURE 1, through a port 42 into chamber 34 may flow into the annular recess 29 under the sleeve 26 of elastomeric material.

The flexible valve closure 26 is in the form of a sleeve of a flexible elastomeric material and mounted in the annular recess 29 of the carrier 25. As shown in more detail in FIGURE 4, the sleeve 26 has a length to closely fit between the end flanges 31 and 32 and annular ribs 26a and 26b at each end for sealing engagement with the bottom of the recess 29 in the valve carrier 25. The sleeve 26 is adapted to overlie and press against the valve seat 24 to seal the orifice ports 27, as shown in FIGURE 4, or to flex outwardly, as shown in FIGURE 6, to uncover the orifice ports. The valve carrier 25 and sleeve 26 mounted in the annual recess 29 are adapted for sliding movement as a unit along the valve seat 24 from the position shown in FIGURE 4 where all of the orifice ports 27 are covered to a position where all of the orifice ports are open at the right hand side of the carrier 25, or to a position where some of the orifice ports are open and others underlie the carrier and are adapted to be open or closed by the sleeve 26.

A rod or rods 44 actuated by a motor, not shown, are connected to slide the valve carrier 25 and sleeve 26 mounted therein along the valve seat 24. The flexible sleeve 26 is actuated into sealing engagement with the valve seat 24 by a motive fluid produced in the gas generator 5, see FIGURES 4 to 6. To this end, the outer wall 33 of the chamber 34 has a conduit 45 opening into the outer annular recess 28 in the valve carrier 25 and the web 30 of the carrier has openings 46 through which the motive fluid flows against the outer periphery of the flexible sleeve 39 to press it against valve seat as illustrated in FIGURE 4. The flow of motive fluid is controlled by an auxiliary two-way valve 47, see FIGURES 2 and 3, for supplying motive fluid to the carrier, see FIGURE 4, or venting it to the atmosphere, see FIGURE 6.

The motive fluid for actuating the sleeve 26 flows from the gas generator 5 through the axial tube 9, see FIGURE 1, and from the tube through a conduit 48 to the valve 47. Another conduit 49 extends from the valve 47 to the atmosphere and as shown in FIGURE 1 it extends to the outer wall 13 of the rocket engine.

The valve 47 may be operated by any suitable mechanism and, in the illustrated embodiment, a remote controlled telecommunication system is shown having an instrument 50, indicated by a box, with electric lines 52 and 53 connected to the valve for operating it by signals from the position shown in FIGURE 4 to that shown in FIGURE 6, and vice versa. When the valve 47 is vented to the atmosphere as shown in FIGURE 6, the liquid fuel to be controlled flows under the flexible sleeve 26 to expand the latter and flow through the orifice ports 27 to the combustion chamber 17. When the sleeve 26 is actuated to the position shown in FIGURE 4 it closes the ports underlying the sleeve to stop the flow of fuel therethrough. Thus, the opening and closing of the ports 27 and 61 constitutes a pulsing of the flow of propellants and thrust applied to the rocket engine 1, and the length of time during which the ports are open determines the period of the pulse which may be varied in accordance with requirements.

The flow of oxidizer is controlled in a similar manner by valve 23 having a valve seat 56, sliding valve carrier 57 and valve closure 58 in the form of a flexible sleeve mounted in an annular recess at one side of the carrier. The valve seat 56 is formed by an inner cylindrical wall having orifice ports 61 formed therein and located opposite the orifice ports 27 and forming an annular space 62 therebetween in the combustion chamber 17. The carrier 57 slides in a chamber 63 formed between the cylindrical valve seat 56 and an inner cylindrical wall 64. Liquid oxidizer is supplied to the right hand end of the annular chamber 63 as viewed in FIGURE 1 from the intermediate section 3 constituting a tank through a conduit 65 and radial passage 66 into the end of chamber 63.

Motive fluid from the gas generator 5 is supplied to the sliding valve carrier 57 through the axial tube 9, conduits 48 and 67 to a two-way valve 68, and from the two-way valve through a conduit 69 in the inner cylindrical wall 64 into an annular recess 70 of the sliding carrier and then through an opening 71 in the web 72 against the flexible valve closure sleeve 58. The valve carrier 57 and sleeve 58 are slid along the valve seat 56 by means of rods 72 actuated by a motor which may also operate the rods 44 for the valve carrier 25.

The liquid fuel and oxidizer are pressurized to insure flow to the combustion chamber 17 by gas from the gas generator 5 which flows through the tube 9 to the forward ends of the tanks formed by the bulkheads 7 and 8. The pressurizing gas flows through a conduit 73 adjacent the bulkhead 7, see FIGURE 1, as controlled by a valve 74 and through a conduit 75 adjacent the bulkhead 8 as controlled by a valve 76. Opening and closing of the valves 74 and 76 also is controlled by the telecommunication instrument 50 having electric lines 77 and 78 connected to the valves.

FIGURE 7 illustrates a modified arrangement of orifice ports 27a and 61a in valve seats 24 or 56, respectively, which are of progressively larger size and arranged in rows inclined longitudinally of the valve seats. With this arrangement, the rate of flow increases in progressively increasing increments as the valve carriers 25 and 57 are slid along the valve seats 24 and 56. Thus, the arrangement of orifice ports shown in FIGURE 7 increases the possible variations in the rate of flow of fuel and oxidizer to the combustion chamber 17.

FIGURES 8 to 12 diagrammatically show virations in the rate of flow which may be produced by the control valve arrangement of the present invention. For example, the curve A in FIGURE 8 shows flow rate plotted against time when the valve carriers 25 and 57 are actuated intermittently to uncover succesive rows of the orifice ports 27 and 61 and showing the stepped pattern of flow rate and thrust produced. FIGURE 9 shows a similar plot B illustrating the increase and decrease in the rate of flow in a smooth linear pattern produced by moving the sliding valve carriers 25 and 57 continuously to uncover ports of progressively increasing size of the kind shown in FIGURE 7. FIGURE 10 shows a plot C illustrating a pattern of flow control and thrust produced by pulsing the flexible sleeves 39 and 58 to alternately open and close all of the orifice ports 27 and 61. FIGURE 11 shows a plot D illustrating a pattern of flow control and thrust produced on the rocket engine 1 by a combined sliding movement of the valve carriers 25 and 57 and a pulsing of the sleeves 39 and 58. In this pattern the rate of flow and thrust is maintained above a certain level at all times with intermittent increases to a maximum rate for varying periods of time during operation. FIGURE 12 shows a plot E illustrating a complex pattern produced by stepped and linear movement of the valve carriers 25 and 57, pulsing of the valve sleeves 26 and 58 and combined sliding valve movement and pulsing to produce practically any pattern desired. The invention having now been described in detail the mode of operation is next explained.

For purposes of description let it be assumed that the tanks in the intermediate and rearward sections 3 and 4 of the rocket engine 1 are filled with oxidizer and fuel, respectively; the pressurizing valves 74 and 76 are closed and the two-way valves 47 and 68 are in the position illustrated in FIGURE 4. To initiate a flight of the rocket engine 1 the igniter 6 of the gas generator 5 is actuated to initiate burning of the solid propellant grain 5 to produce gas under pressure. Simultaneously, the receiver 50 of the telecommunication system is energized and operating through the lines 77 and 78 opens valves 74 and 78 to deliver gas from the gas generator 5 to the forward area of the tanks. Pressurized oxidizer then breaks a seal, not shown, and flows through the conduit 65 and radial passage 66 into the chamber 63 at the rearward end of the carrier 57. Simultaneously, pressurized fuel breaks a seal and is delivered from the tank 12 through the channel 16 formed between the guiding shield 15 and inner wall 14 of the combustion chamber and passage 42 into the rearward end of the chamber 34. Gas from the gas generator 5 also flows through the tube 9 and conduit 48 to the two-way valve 47 and then through conduit 45 into outer annular recess 28 in the valve carrier 25, opening 46 in the web thereof and against the outer face of the annular sleeve 26. Pressurized gas then holds the sleeve 26 tightly against the orifice ports 27 which it covers to completely close the latter. Simultaneously motive fluid flows through the conduit 67 to two-way valve 68 and conduit 69 into valve carrier 57 and through the openings 71 to engage the valve sleeve 58 tightly against the valve seat 56 to completely close orifice ports 61 therein.

By moving the valve carriers 25 and 57 from the position shown in FIGURE 4 to that shown in FIGURE 5, the rearward two rows of orifice ports 27 and 61 are uncovered through which the fuel and oxidizer flow into the combustion chamber 17 where the propellants burn to produce products of combustion. These products of combustion then flow through the nozzle 18 and produce a forward thrust on the rocket engine 1. The valve carriers 25 and 57 may be moved intermittently by rods 44 and 72 to uncover successive rows of orifice ports 27 and 61 to gradually increase the flow of liquid oxidizer and fuel and the thrust produced on the rocket engine as illustrated by plot A in FIGURE 8, or the sliding carriers may be operated continuously, and especially when orifice port 27a of the type shown in FIGURE 7 are used, to gradually increase the flow rate and thrust produced as shown by plot B in FIGURE 9. Instead of moving the valve carriers 25 and 57 longitudinally of the valve seats 24 and 56, the latter may be held stationary and the valve sleeves 39 and 58 may be pulsed intermittently to deliver liquid at a maximum rate through all of the orifice ports 27 and 61 in the manner illustrated by plot C in FIGURE 10. To this end, the two-way valves 47 and 68 are turned from the positions shown in FIGURE 4 to that shown in FIGURE 6 to vent the annular recess 29 and 70 to the atmosphere. Liquid fuel and oxidizer under pressure in the chambers 34 and 63 then force the valve sleeves 26 and 58 outwardly away from the valve seats 24 and 56 in the manner shown in FIGURE 6 to permit flow of the liquids through the orifice ports 27 and 61 dependent upon the size of the ports and the pressure of the liquids. Also, the period of time during which the orifice ports 24 and 56 are open may be varied by varying the time while the two-way valves 47 and 68 are in the position illustrated in FIGURE 6 to vary the actual rate of flow and thrust produced as illustrated by the plots C and D in FIGURES 10 and 11. In addition, the liquid flow may be controlled by sliding the valve carriers 25 and 57 along the valve seats 24 and 56, and simultaneously pulsing the sleeves 26 and 58 to get a combined variation in the flow rate, resulting from uncovering successive ports and intermittently pulsing the remaining ports, to produce any desired pattern of control such as the plot E illustrated in FIGURE 12. It will be understood that the valve carriers 25 and 57 may be moved in either direction along the valve seats 24 and 56 to first increase the flow rate and thrust produced and then decrease the flow rate and even shut-off the flow of liquid propellants to the combustion chamber 17.

It now will be observed that the invention provides an improved control valve arrangement for regulating the rate of flow of a liquid through a great range of variations. It also will be observed that the present invention provides an improved control arrangement for producing a large variety of throttling patterns for monopropellants and bipropellants in a rocket engine for producing different desired operating conditions. It will be still further observed that the present invention provides an improved control valve arrangement which is of simple and compact construtcion, economical to manufacture and one which is reliable in operation for providing continuous throttling of liquid propellants with positive shut-off when required, and producing variation in the rate of flow of a monopropellant or bipropellant and thrust produced from zero, or any level above zero, to a maximum amount.

While a single embodiment of the invention is herein illustrated and described, it will be understood that changes may be made in the construction and arrangement of elements without departing from the spirit or scope of the invention. Therefore, without limitation in this respect the invention is defined in the following claims.

We claim:

1. In a system for delivering liquid from a vessel at varying rates, a wall associated with said vessel and having orifice ports therein arranged in spaced relation therealong, a valve having a carrier with a recess overlying the orifice ports in the wall and a closure in said recess movable toward and away from said wall, means for sliding the valve along the wall to uncover successive orifice ports, means for supplying a fluid under pressure to said recess in the carrier to force the closure into engagement with the wall to cover the orifice ports which it overlies, and means for supplying liquid to be delivered to at least one end of said valve for flow through the orifice ports uncovered by said valve and closure.

2. In a rocket engine of the type having at least one tank containing a liquid propellant, a combustion chamber having a nozzle at one end of the rocket engine through which products of combustion flow to propel the engine, the combination with said elements of a generally cylindrical wall in said combustion chamber and having orifice ports therein arranged in spaced relation therealong, a valve in the form of a sleeve adjacent said combustion chamber wall and movable along said wall and toward said wall, respectively, means for moving the valve along said wall to uncover orifice ports in the cylindrical wall, successively, means for supplying a motive fluid against said valve sleeve for moving it towards said wall to cover the remaining orifice ports, and means for delivering liquid propellant to at least one end of said valve sleeve.

3. A rocket engine in accordance with claim 2 in which the orifice ports are arranged in a series of rows around the periphery of said cylindrical wall.

4. A rocket engine in accordance with claim 2 in which the valve comprises a carrier mounted to slide along the cylindrical wall, said carrier having an annular recess therein overlying the orifice ports, and the flexible sleeve being mounted in the annular recess in said carrier for movement toward and away from said wall.

5. A rocket engine in accordance with claim 4 in which the valve carrier is in the form of an annular piston, annular recesses formed in the inner and outer peripheries of said piston, a second cylindrical wall spaced from the first mentioned wall having the orifice port to form an annular chamber in which the annular piston slides, sealing means on the lands of the piston valve at the inner and outer peripheries, means for supplying a motive fluid to one of the recesses, said flexible sleeve being mounted in the other recess, and openings in the piston valve between the recesses for directing motive fluid against the flexible sleeve to press it into engagement with the wall having the orifice ports therein.

6. A rocket engine in accordance with claim 5 in which means are provided to supply liquid to be controlled to the chamber at one end of the piston, and said piston having an opening at one end to supply the liquid to be delivered to one end of the flexible sleeve.

7. A rocket engine in accordance with claim 4 in which the motive fluid is gas from a gas generator, a conduit connected to the gas generator for supplying motive fluid to actuate the flexible sleeve, and an auxiliary valve in said conduit for supplying motive fluid continuously to retain the sleeve engaged with the wall having orifice ports and intermittently to pulse the flow of fluid through all of the orifice ports.

8. A rocket engine in accordance with claim 3 in which the orifice ports of each row advance progressively longitudinally of the cylindrical wall, and the orifice ports of each row being of progressively increasing diameters.

9. A rocket engine in accordance with claim 2 in which a second generally cylindrical wall is provided in the combustion chamber and spaced radially from the first wall to form an annular space therebetween, said second wall having a plurality of orifice ports therein and arranged in spaced relation therealong, a second valve having a flexible sleeve overlying said second wall and movable along said wall to uncover orifice ports, successively, and towards said wall to cover the other orifice ports, means for moving the valve along said wall, means for supplying a motive fluid to move said second valve sleeve toward said wall, and means for delivering a second propellant liquid to at least one end of the valve sleeve.

10. A rocket engine in accordance with claim 9 in which the liquid propellant supplied through the orifice ports in one wall is a fuel and the propellant supplied through the other wall is an oxidizer, and the inner and outer walls facing each other to form an annular space in the combustion chamber to direct the fuel and oxidizer into contact with each other.

11. A rocket engine in accordance with claim 9 in which the second valve comprises a carrier slidable along the cylindrical wall and having an annular recess in the periphery thereof and the flexible sleeve being mounted on the annular recess, a conduit for supplying a motive fluid against the sleeve to move it into engagement with the cylindrical wall, an auxiliary valve in the conduit for controlling flow of motive fluid to the annular recess, and means for actuating the auxiliary valve in the motive fluid supply lines for the separate valve sleeves, simultaneously, to continuously supply motive fluid and intermittently supply motive fluid to pulse the supply of liquid fuel and oxidizer to the combustion chamber.

12. A rocket engine in accordance with claim 11 in which the auxiliary control valves in the motive fluid lines are operable to two positions, said valves in one position being connected to supply motive fluid under pressure, and in another position shutting off the supply of fluid to the annular recess and venting the annular recess to the atmosphere.

References Cited

UNITED STATES PATENTS

| | | | |
|---|---|---|---|
| 2,754,656 | 7/1956 | Munger | 60—258 |
| 2,810,259 | 10/1957 | Burdett | 60—258 |
| 3,001,365 | 9/1961 | Kellogg | 60—258 |
| 3,344,605 | 10/1967 | Mageean | 60—258 |

MARTIN P. SCHWADRON, *Primary Examiner.*

DOUGLAS HART, *Assistant Examiner.*

U.S. Cl. X.R.

60—258, 39.74; 251—210, 331, 334; 137—599.2, 625.3